Aug. 5, 1969     M. H. GOOSEY ET AL     3,459,925

HIGH SPEED TEMPERATURE MONITOR

Filed Oct. 21, 1965     5 Sheets-Sheet 1

INVENTORS.
John N. Wilson
Malcolm H. Goosey
Arthur H. Dexter
Richard W. Leep
Wayne K. Hodder
Lewis C. Page
Edward R. Brady

BY

ATTORNEY.

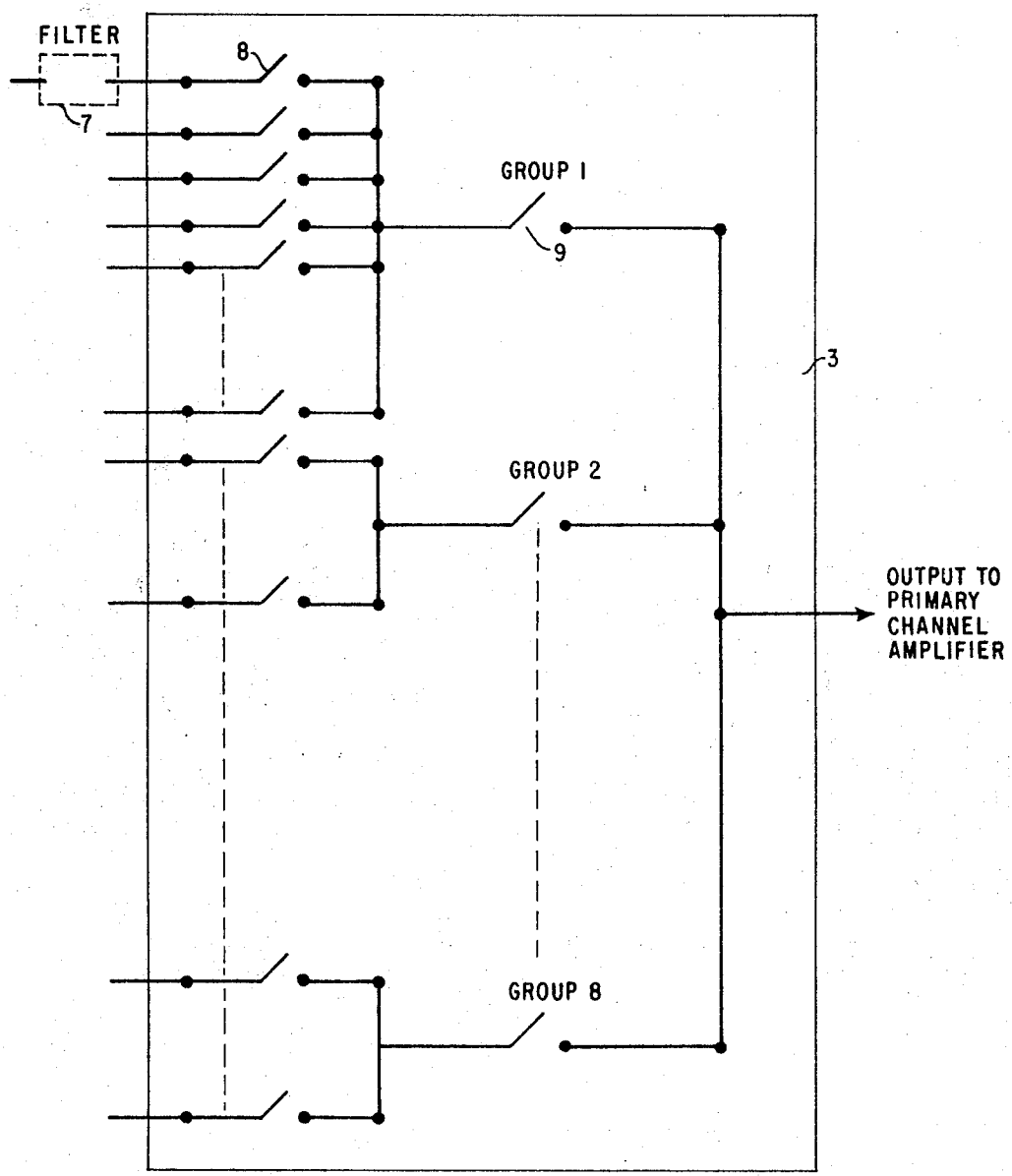

INVENTORS.
John N. Wilson
Malcolm H. Goosey
Arthur H. Dexter
Richard W. Leep
Wayne K. Hodder
Lewis C. Page
Edward R. Brady

BY

ATTORNEY.

United States Patent Office

3,459,925
Patented Aug. 5, 1969

---

3,459,925
HIGH SPEED TEMPERATURE MONITOR
Malcolm H. Goosey, Arthur H. Dexter, and John N. Wilson, Aiken, S.C., Richard W. Leep, Los Alamos, N. Mex., and Wayne K. Hodder, Glendora, Edward R. Brady, Sierra Madre, and Lewis C. Page, Santa Ana, Calif., assignors to the United States of America as represented by the United States Atomic Energy Commission
Filed Oct. 21, 1965, Ser. No. 500,452
Int. Cl. G06f *15/36*
U.S. Cl. 235—151                                                   1 Claim

ABSTRACT OF THE DISCLOSURE

A high speed temperature monitor has been provided which scans a large number of thermocouple inputs to provide essentially a continuous monitoring with a minimum of data channels. The monitor reads sequentially the output from as many as 2,500 reactor thermocouples ten times each second. These readings are amplified and translated into machine language. These machine signals next enter a special purpose digital computer whose operation is carefully synchronized to the scanning rate so as to minimize memory requirements. Readouts are incorporated to permit surveillance of the temperature distribution in the reactor and control of the reactor.

---

Figure 1:
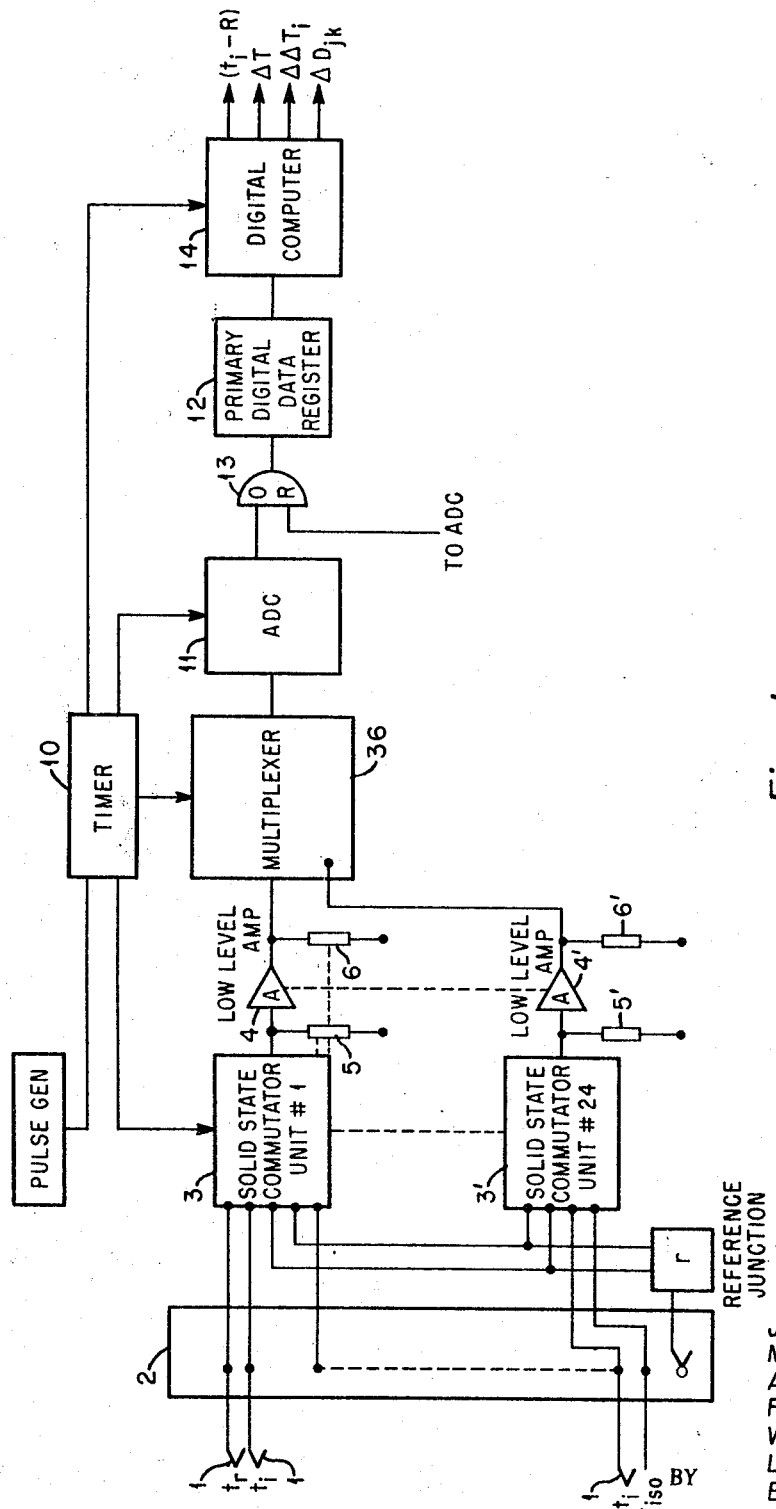

This invention relates to sampling and measuring systems, and more particularly to systems for periodically sampling a multiplicity of signals representing a condition and converting those signals into a form that can be measured and used.

In the operation of modern equipment there is often a need for continuous monitoring of some condition, such as temperature, pressure, humidity, nuclear activity, voltage, and velocity, or the operability of parts of the system. For this purpose many continuous channels are employed, but in a large system or where information is handled from many different sources, or involves a wide range of information, this results in a complicated and expensive monitoring system with many duplicate components such as amplifiers, filters, discriminators and recorders, which can vastly increase the maintenance requirements.

This is particularly true in the measurement of fuel coolant temperatures in nuclear power reactors. The detailed measurement of fuel coolant temperatures provides an accurate, reliable and reasonably available means for determining the reactor performance, such as abnormal or unsafe reactor operation, and the failure of fuel elements, and provides a basis for detailed reactor control. This is important in connection with fuel failure detection. Fuel elements must be operated at high temperatures for economic operation of power and production reactors, and the margin between the operating temperature and the limiting safe temperature is usually very small. While offering major advantages in fabrication, uranium metal fuel assemblies, when they are used, are subject to severe attack by coolant water when the surface cladding fails and permits contact. The flow of coolant through a fuel element may be partially blocked by a swollen fuel element, or even the accidental intrusion of a foreign object. Such a restriction of flow may cause the fuel element to melt if not immediately detected and corrective action taken.

For sampling the temperature of the coolant passing from the fuel assembly a temperature sensor is employed. It generally takes the form of a thermocouple and is positioned at or near the outlet end of each fuel assembly. The small output voltages of the thermocouples must be amplified before they can be used. Since a large reactor may require from 200 to 2,000 or more thermocouples, a substantial quantity of electronic equipment may be needed. With a continuous monitoring system a multiplicity of separate signal channels is required. Each signal channel would include an amplifier and associated equipment for each thermocouple to be monitored. Such a system would be complicated in its duplication of circuits, expensive in the many amplifiers and other circuit elements required, and pose a substantial maintenance problem in maintaining its operation.

Applicants with a knowledge of these problems of the prior art have for an object of their invention the provision of a solid state monitoring system for repeatedly scanning and measuring a large number of signals at speeds sufficiently great to satisfy the requirements of a continuous monitor.

Applicants have as another object of their invention the provision of a high speed temperature monitor for periodically scanning the signals from a large number of thermocouples with sufficient speed that each thermocouple voltage is measured in less time than the response time of the thermocouples and thus satisfy the requirements of a continuous monitoring system.

Applicants have as a further object of their invention the provision of a solid state temperature monitor that will scan a large number of signals at such a high rate of speed as to obviate the need for a continuous monitor with its multiplicity of signal channels and associated equipment and the maintenance requirements needed in its operation.

Applicants have as a still further object of their invention the provision of a high speed temperature monitor for periodically scanning the signals from thermocouples employed to measure the temperature change across the fuel elements of a nuclear reactor and provide data signals that may be used to control or close down the reactor or detect failure of any of the fuel elements.

Other objects and advantages of our invention will appear from the following specification and the accompanying drawings, and the novel features thereof will be particularly pointed out in the annexed claims.

Figure 2:
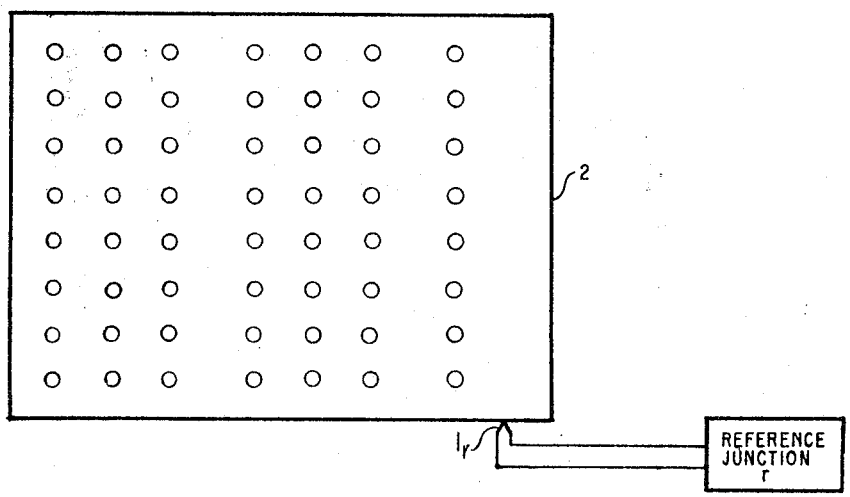
Figure 4:
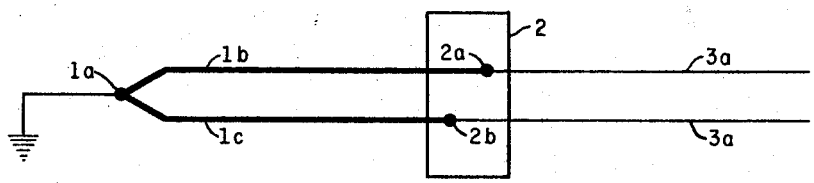
Figure 5:
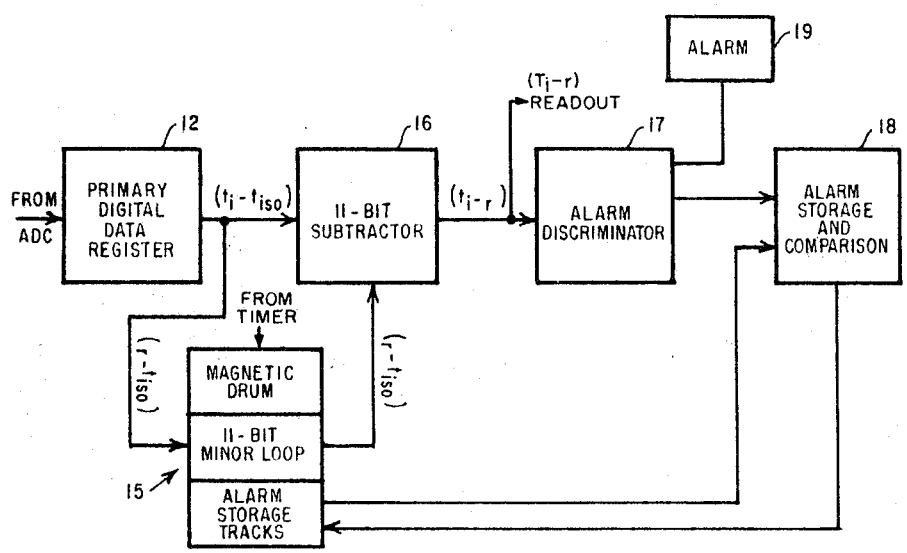
Figure 6:
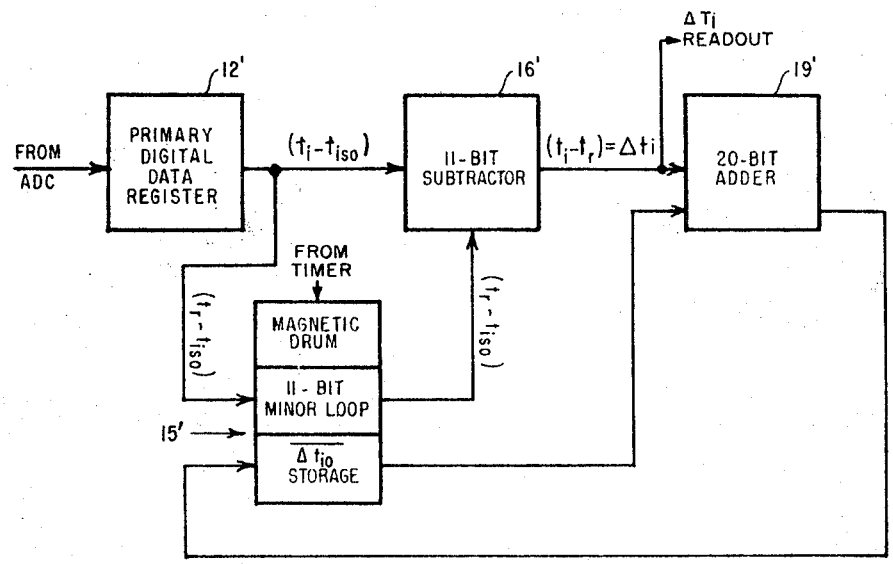
Figure 7:
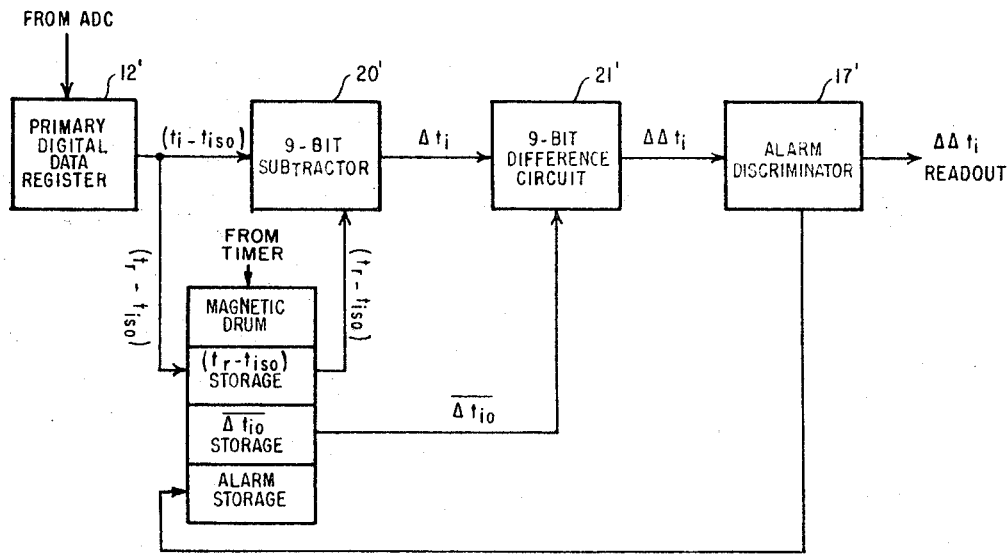
Figure 8:
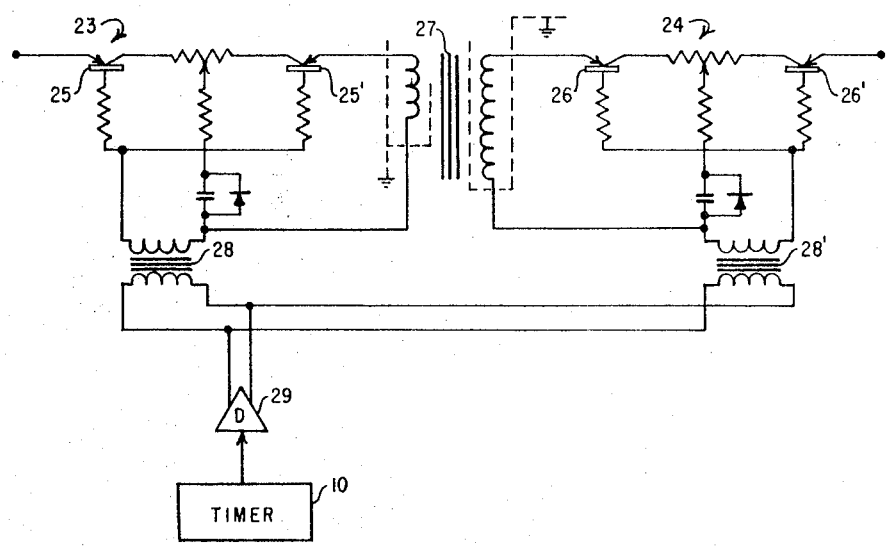

In the drawings, FIG. 1 is a block diagram of our improved high speed temperature monitor. FIG. 2 is a schematic of the isothermal panel used in our improved monitor. FIG. 3 is a schematic of a switch group of the solid state commutator used in our improved monitor. FIG. 4 is a schematic showing the thermocouple wires joined to copper leads at the isothermal panel. FIG. 5 is a block diagram of our improved system showing an arrangement for computing the value of $t_i-r$. FIG. 6 is a block diagram showing an arrangement for computing $\overline{\Delta t_{i_0}}$. FIG. 7 is a block diagram showing an arrangement for computing $\Delta \Delta t_i$. FIG. 8 is a schematic of the circuit of a preferred form of a solid state switching unit.

Referring to the drawings in detail, and particularly to the system of the block diagram of FIG. 1, thermocouples of conventional type for sensing temperature and providing an electrical potential that corresponds thereto are shown at 1. Mineral insulated thermocouples of both "Chromel-Alumel" and "iron-constantan" materials, enclosed in stainless steel sheaths are satisfactory for the temperature range of 100° C. to 600° C.

In a large liquid cooled reactor, for example, each stream of coolant coming out of the many fuel assemblies is monitored by one or more thermocouples. The hot junctions 1a (FIG. 4) of the thermocouples should be grounded in order to secure a reasonably fast response time to temperature changes. The response time of the thermocouples should be short compared with the time in which a fuel element would melt as a result of a temperature transient.

Cold junction errors can be handled in a number of ways; however, in the case of a temperature monitor in which hundreds or thousands of thermocouples must be dealt with, it is more economical to employ a single common compensating unit for all thermocouples. It is common practice to join the thermocouple leads to pairs of copper wires that can be routed some distance to the temperature monitor, which is usually located in a radiation-free region such as a control room.

The preferred compensation system employs an isothermal panel to maintain all cold junctions at the same (but not necessarily constant) temperature. This arrangement permits temperature variations at the cold junctions to be compensated by one unit. The isothermal panel is relatively simple and eliminates the numerous problems associated with a thermostated oven.

The thermocouple wires (FIG. 4), iron $1b$ and constantan $1c$, are terminated in an isothermal panel 2, comprising a thermally conducted metal plate located close to the reactor where they are joined to copper leads $3a$ which extend to the commutation unit 3. These terminal joints $2a$ and $2b$ comprise the cold junctions for each thermocouple. All the thermocouple leads are electrically insulated from each other but thermally joined to the plate 2 of FIG. 2 through the terminal strips so that they will be maintained at a common temperature, i.e., the temperature of plate 2.

In this arrangement, $T_1$ is the thermocouple voltage proportional to the effluent water temperature. $T_{iso}$ is the thermocouple voltage proportional to the isothermal panel temperature. $T_r$ is the thermocouple voltage proportional to the temperature of the inlet coolant water of the reactor. $r$ is the reference temperature for the isothermal plate 2.

The $t_i - t_{iso}$ signals at the isothermal panel, mentioned above, would then be transmitted over a distance of up to 100 feet or more from plate 2 to the temperature monitor input panel in the control room. As a consequence of the electrical grounding of the thermocouple in the reactor and the distant ground of the temperature monitor, a common mode signal is to be expected. It is estimated that this signal may be as large as one volt, peak-to-peak, from D.C. to 60 c.p.s.

In addition to the process thermocouples, as many as 24 ungrounded reference thermocouples can be employed to monitor the coolant inlet $(t_r - t_{iso})$ temperatures. These thermocouples would also terminate at the isothermal plate 2 and have their signals carried to the terminal board by means of copper leads as in the case of the process thermocouples.

A single ungrounded thermocouple $l_r$ will be used to provide a standard reference signal. This thermocouple is in thermal contact with the isothermal plate and will be returned to a thermocouple reference junction within the temperature monitor to provide a signal $(r - t_{iso})$.

The thermocouple outputs are coupled into the solid state commutator switches of unit 3. Each switching unit contains 8 switching groups and each group has 13 solid state switching channels, as shown in FIG. 3. The output of each switching unit 3 feeds into a wide band low level-high gain A.C. coupled D.C. amplifier 4 controlled by low and high level clamps 5, 6 positioned at the input and output of the amplifier 4, as shown in FIG. 1, to provide rapid D.C. restoration. There are 24 commutator units 3 and 24 amplifiers 4 that feed into 24 switches of the multiplexer 36, the solid state commutator being disclosed in the copending application of Wilkinson et al., S.N. 506,915 filed Nov. 5, 1965.

With 24 units, each having 8 groups and 13 signal channels in each group, there is a total of 2,496 channels. As shown in FIG. 3, each channel has a low pass filter 7 dotted in, that blocks the high frequency noise and feeds the analog signal to the commutator switch 8. This switch may take any suitable form, including an electromechanical relay, but preferably comprises a pair of solid state switching units 23, 24, as shown in FIG. 8, each employing a pair of transistors 25, 25′ and 26, 26′ connected back-to-back in the manner of the patent to Shockley, No. 2,891,171. The switching units are preferably coupled through a shielded transformer 27 with a primary-to-secondary turn ratio of 1:2 to provide voltage amplification. The shielded transformer also provides common mode rejection. The switching elements are driven through driver transformers 28, 28′ and drivers 29 from the timer or pulse generator 10. Each switching group of unit 3 is coupled to the other seven groups through solid state sub-commutator switches 9, also controlled in a similar manner from timer 10 of FIG. 1. The sub-commutator switch 9 differs from the commutator switch 8 in that it uses a single pair of back-to-back connected transistors as in Shockley, supra.

The multi-input switches 8, which serve to connect each thermocouple input in succession into the analog system, are referred to as primary channel commutators. Each commutator unit 3 handles 104 inputs. The first input to each commutator is common reference signal which is employed to check system performance. The second and third inputs to each commutator are the $(r - t_{iso})$ and $(t_r - t_{iso})$ signals. The remaining 101 inputs are used for the process thermocouple inputs $(t_i - t_{iso})$.

The low level amplifier 4, described in the copending application of Hodder, S.N. 459,488 filed May 27, 1965 is a wide band, low noise-high gain solid state amplifier with D.C. restoration through use of solid state switches 5, 6, which employ back-to-back connected transistors coupled in the manner of the Shockley patent, supra.

The multiplexer 6 is conventional and is essentiaally a switch that takes the outputs from the various low level amplifiers 4 and sequentially passes them to the analog-digital converter 11, herein called the ADC. If a redundancy circuit is desired, a second multiplexer (not shown) may be connected in parallel with the first to feed a second ADC (not shown).

Analog signals from the thermocouples 1 are of steady or slightly varying state. When subjected to the action of the switches 8, they are converted to pulses. The multiplexer switches 36 are timed in closing to clip the front part of these pulses, containing superimposed noise voltages resulting from transformer ringing, etc., and pass only the last part of each pulse. This has the effect of reducing the pulse width from 80 microseconds to 40 microseconds. The low level solid state amplifiers 4 are A.C. coupled, but the constants of their circuits are made sufficiently long that the pulses will be amplified and passed without significant amplitude distortion, and the clamps 5, 6 will rapidly restore the amplifier in preparation for the next pulse.

The ADC 11 may be any suitable conventional type having a conversion time less than 35 microseconds. Thus, the thermocouple signals are processed within the analog portion of the monitor so as to obtain a sequential series of binary encoded digital words at the output of the analog system. Each of these words is a digital representation of the voltage output of a particular thermocouple at that instant of time. The thermocouple signals are measured and digitized 10 times per second by the analog system to provide a total of 24,960 signals per second from 2,496 channels.

The principal digital data register 12 receives its digital words from the ADC and sends out digital bits corresponding thereto to operate the digital computer 14. The digital computer 14 may be any suitable digital computer including a memory or storage system for receiving digital information from register 12 and processing it to provide certain data as desired for determining conditions in a nuclear reactor.

The system may be employed to determine absolute temperature $(t_1 - r)$. The reference signal $(r - t_{iso})$ is received from the reference thermocouple digitized in the ADC 11, and stored in the digital computer 14. Then in sequence, signals $(t_i - t_{iso})$ from the thermocouples sensing the coolant flow from each fuel element are received and fed to the computer after being digitized. In the digital computer the reference signal is subtracted from each of the thermocouple signals to provide a resultant data signal that corresponds to absolute temperature.

As an example of its use, reference signal $(r-t_{iso})$ from register 12 is fed to digital computer 14 during a selected time interval, and its value is temporarily stored in the memory circuit, which may take the form of a 11-bit minor loop 15, i.e., eleven tracks on a magnetic drum, as indicated in FIG. 5. This reference signal $(r-t_{iso})$ is fed from the drum to an 11-bit subtracter 16 where it is subtracted, in turn, from each of the sequence of $(t_i-t_{iso})$ values as they arrive in sequence from register 12. The subtractions provided the sequence of signals $(t_i-r)$, the absolute temperatures, less a constant. If desired, the signals can then be passed to an alarm discriminator 17 which determines whether any $(t_i-r)$ signal is in excess of the pre-set limit. If so, a signal is passed to an alarm 19 or, alternatively if desired, to an alarm comparison circuit 18. If the comparison circuit 18 receives a second alarm signal from the same thermocouple on the next scan, a signal is generated by circuit 18 which may be utilized in a number of ways, i.e., to operate an alarm, or an indicator, or to acuate the control rods of a reactor.

In a similar manner, thermocouple signal $(t_r-t_{iso})$ may be fed to the digital computer 14 and subtracted in sequence from the signals $(t_i-t_{iso})$ derived from thermocouples sensing coolant discharge from the fuel elements. This can provide an indication of ΔT, the temperature across the fuel element.

In another operation the computer 14 can compute $\Delta\Delta t_i$, which is the result of subtracting each $\Delta t_i$ from its respective $\overline{\Delta t_{io}}$. This gives a measure of the amount of change of the temperature across the fuel elements since a predetermined time. The primary switch, shown in FIG. 8 as the first back-to-back transistor pair, does not have an offset adjustment in our actual prototype since the adjustment 24 provided on the secondary switch is capable of compensating for both.

As a second example of this use of the system, average values of $\Delta T_i$ herein called $\overline{\Delta t_{io}}$ may be determined at full operating power of the reactor by averaging a large number of readings from each thermocouple, say 128 readings. This average value will be used in other calculations where greater accuracy is needed than could be obtained by using a single measurement of $\Delta t_{io}$. The $\overline{\Delta t_{io}}$ may be calculated, as shown in FIG. 6. The values of $(t_r-t_{iso})$ from the register 12' are recorded in the 11-bit minor loop tracks 15' of the magnetic drum, and are subsequently subtracted from the $(t_i-t_{iso})$ values, in the 11-bit subtracter 16', as the latter are fed in from the register 12'. The resultant $\Delta t_i$ signals $(t_i-t_r)$ are routed to a 20-bit adder 19'. During the first cycle, the $\Delta t_i$ values are added to the number $2^8$ in the adder 19' so that the $\overline{\Delta t_{io}}$'s are rounded values. These values are temporarily stored, as on a magnetic drum 15', and are returned to the adder 19' in time to add to the new incoming $\Delta t_i$ values. These new sums are again temporarily stored on the drum, again returned to the adder, etc. This process is repeated until 128 $\Delta t_i$ values have been added together for each thermocouple. On the 128th cycle, the sums emerging from the adder 19' are divided by $2^7$. This is done by dropping the 7 least significant bits. The resultant $\overline{\Delta t_{io}}$ values are permanently stored on the magnetic drum until the monitor is programmed again.

The manner in which the $\Delta\Delta t_i$ are arrived at using $\Delta t_i$ signals can be seen in FIG. 7. The $(t_r-t_{iso})$ values from the register 12' are recorded on the magnetic drum 15' and then passed to a 9-bit subtracter 20' where they are subtracted from the incoming $(t_i-t_{iso})$ values. The differences, $\Delta t_i$, are passed, in turn, to a 9-bit difference circuit 21', where the drum stored values of $\overline{\Delta t_{io}}$ corresponding to each $\Delta t_i$ are subtracted to yield $\Delta\Delta t_i$. The receiving operation of the alarm discriminator is similar to that described in connection with FIG. 5.

Finally, the digital computer 14 may provide data for locating fuel element failure. First, it sums the $\Delta t$, i.e. $(t_i-r)$ values for all channels in a fuel assembly to give an average value $\overline{(t_i-t_r)}$ for the fuel assembly. This is subtracted from the individual channel values and the difference is represented by $D_{jk}(t)$. At a time defined as "zero" for the purpose of this calculation, the operator stores the current values of $D_{jk}(t)$ in a permanent memory location. These values are then known as $D_{jk}(o)$. All future values of $D_{jk}(t)$, which are continuously being recalculated, will be subtracted from the corresponding value of $D_{jk}(o)$ to yield $\Delta D_{jk}(t)$.

The above information may be used by an operator to adjust the reactor, close it down, or detect the location of a fuel element that has failed.

Having thus described our invention, we claim:

1. A high speed temperature monitor for nuclear reactors having multiple coolant channels comprising junction grounded process thermocouples located in the coolant channels to sense the inlet and outlet coolant temperatures with a minimum response time, an isothermal panel located in close proximity to the reactor and having the thermocouple leads thermally connected thereto to maintain all junctions at the same temperature, a reference thermocouple in thermal contact with said isothermal panel to provide a standard reference signal, a plurality of D.C. restored high gain amplifiers for amplifying the thermocouple signals, the process thermocouples being arranged electrically in a plurality of discrete groups, a plurality of solid state commutator switches operable to rapidly sequentially connect said reference thermocouple and said discrete groups of process thermocouples to the inputs of respective ones of said amplifiers at a speed substantailly less than the response time of said process thermocouples, an analog-to-digital converter, a multiplexer phased with the commutator switches and connected to said amplifiers to multiplex the output signals from said amplifiers for sequentially connecting each amplified thermocouple signal to the analog-to-digital converter for converting the analog voltage pulses into binary encoded words, and a digital system connected to the output of said converter and responsive to the signals received from the converter to provide temperature information for controlling the reactor.

References Cited

UNITED STATES PATENTS

| | | | |
|---|---|---|---|
| 3,201,572 | 8/1965 | Yetter | 235—151 |
| 3,271,651 | 9/1966 | Diederich | 73—359 X |
| 3,147,370 | 9/1964 | Lowman | 235—151.13 |
| 3,247,498 | 4/1966 | Sadvary et al. | 235—151.13 |
| 2,601,508 | 6/1952 | Fastie | 73—355 X |
| 2,851,574 | 9/1958 | Linhart et al. | 73—359 X |

MALCOLM A. MORRISON, Primary Examiner

E. J. WISE, Assistant Examiner

U.S. Cl. X.R.

73—355, 361; 176—19; 235—151; 250—47; 317—41; 324—106